United States Patent [19]
Abromavage et al.

[11] 3,713,662
[45] Jan. 30, 1973

[54] CHASSIS WITH STORAGE SPACE

[75] Inventors: John C. Abromavage, Tempe; Henry S. Shattles, Phoenix, both of Ariz.

[73] Assignee: Advanced Management Engineering & Research Co.

[22] Filed: Oct. 14, 1970

[21] Appl. No.: 80,586

Related U.S. Application Data

[62] Division of Ser. No. 837,246, June 27, 1969, Pat. No. 3,559,826.

[52] U.S. Cl. ..............................280/106 R, 296/37
[51] Int. Cl. ............................................B62d 21/00
[58] Field of Search ..........280/106 R, 106 T; 296/37

[56] References Cited

UNITED STATES PATENTS

| | | |
|---|---|---|
| 3,287,058 | 11/1966 | Wells....................................296/37 |
| 3,300,228 | 1/1967 | Bertolini..........................280/106 T |
| 1,754,927 | 4/1930 | Andren............................280/106 R |

*Primary Examiner*—Philip Goodman
*Attorney*—David H. Semmes

[57] ABSTRACT

An automotive chassis of the type including a pair of longitudinally extending channels and a plurality of transverse cross members intersecting said channels, the transverse members being of a reduced cross section so as to define a longitudinally extending storage space intermediate the tops of the transverse cross members and the tops of the pair of channels, particularly such a construction used to support a longitudinally extending ramp slidable from the rear end of the chassis to facilitate loading of the truck.

1 Claim, 13 Drawing Figures

PATENTED JAN 30 1973

INVENTORS
JOHN C. ABROMAVAGE
HENRY S. SHATTLES

BY David N. Lemmer
ATTORNEY

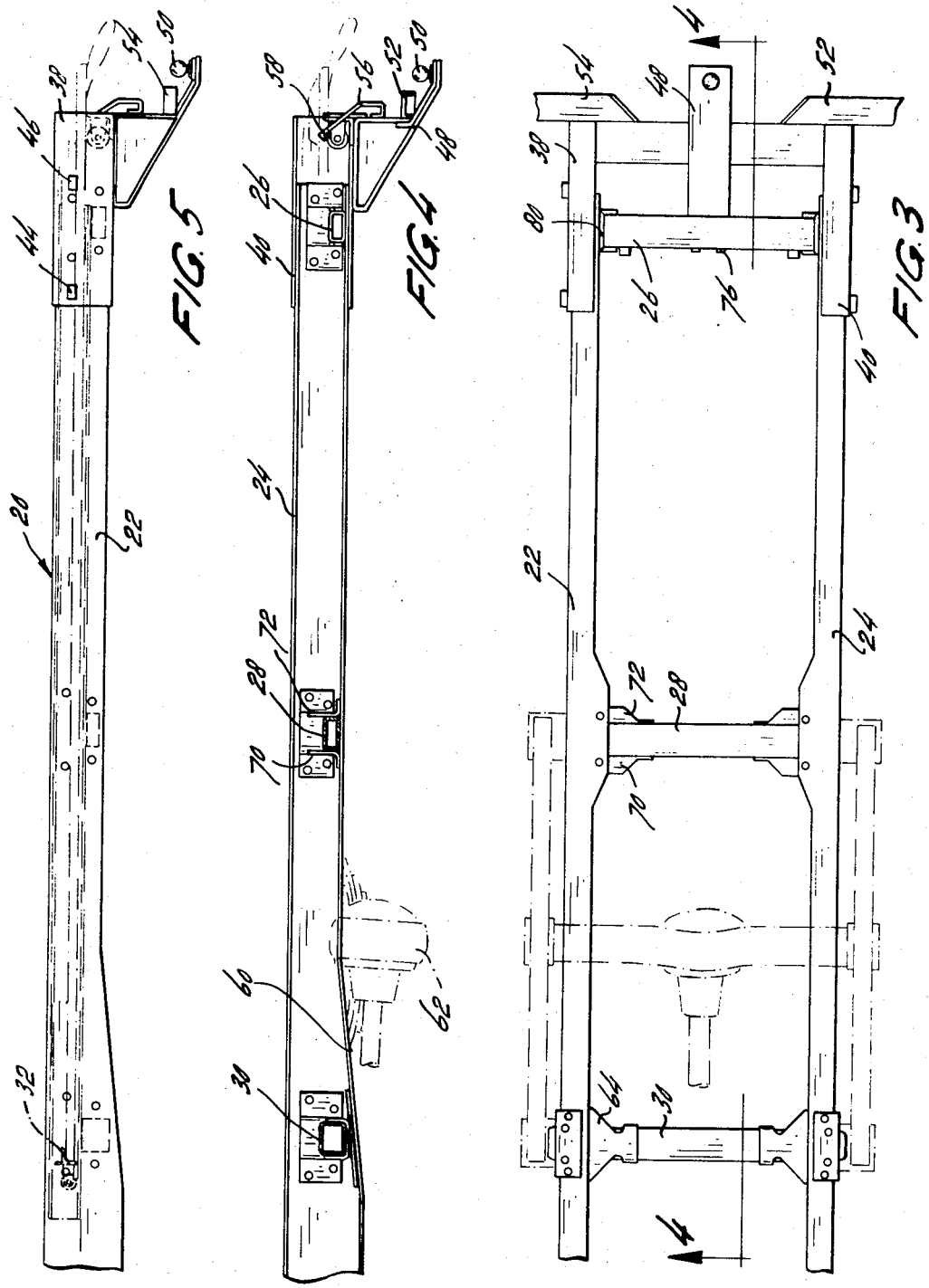

PATENTED JAN 30 1973　　　　　　　　　3,713,662

INVENTORS
JOHN C. ABROMAVAGE
HENRY S. SHATTLES by David H. Semmes
ATTORNEY

CHASSIS WITH STORAGE SPACE

CROSS-REFERENCES TO RELATED APPLICATIONS

A division of AUTOMOTIVE CHASSIS (Ser. No. 837,246), filed June 17, 1969 and issued as U.S. Pat. No. 3,559,826, on Feb. 2, 1971.

RAMP ASSEMBLY (Ser. No. 787,188), filed Dec. 26, 1968.

In the earlier application, there was disclosed a ramp assembly, slidably positioned within a modified truck chassis. The ramp is stored beneath the truck body and within the confines of the chassis, then longitudinally withdrawn from the rear of the chassis. As the ramp is withdrawn, it is pivoted so that the ramp rear end touches the ground, providing an inclined walkway for truck loading.

The present application is restricted to the techniques for modifying a chassis to provide for storage of such a ramp or other materials.

BACKGROUND OF THE INVENTION

1. FIELD OF THE INVENTION

In a typical truck chassis, the longitudinally extending beams and transverse interconnecting struts substantially have the same cross section or height. Very little consideration has been given to modifying or reducing the cross section of the transverse members so as to provide a storage space within the vertical confines of the longitudinally extending beams.

2. DESCRIPTION OF THE PRIOR ART

Prior art searching has developed the following:

| Harley | 276,685 |
| Leach | 860,752 |
| Huwyler | 1,346,891 |
| Pflaum | 1,758,372 |
| Slater | 2,169,661 |
| Ratcliffe | 2,169,661 |
| Terry | 2,398,730 |
| Kelberer | 2,457,380 |
| Ferguson | 2,900,094 |

The prior art has directed itself principally to modifying the truck bottom, rather than the chassis, to accommodate slidable ramps. Consequently, the truck body had been required to be heightened by the amount necessary to enclose the slidable ramp. Harley, Huwyler (FIG. 2), Kelberer are typical in this respect, the slidable ramp assembly being positioned intermediate the bottom of the truck body and the chassis.

One inventor has positioned his ramp upon a rotatable drum. Ratcliffe and Slater were selected as showing the slidable positioning of ramp elements on top of the truck body, virtually precluding use of the truck body except for ramp storage purpose. Ferguson articulates his ramp at the rear of the truck body (FIGS. 2 and 3). Terry was selected as showing the positioning of slidable structures upon a hinged support on the vehicle body.

SUMMARY OF THE INVENTION

According to the present invention, the transverse members are constructed from rectangular tubing of reduced cross section and supported within the longitudinal channels by special plates which abut the sides and top of the transverse members. In addition, the longitudinal members are downwardly inclined at their fore end, so as to support the entire assembly above the truck or automobile differential. Guide tracks are supported upon the transverse members, so that a slidable ramp may be reciprocated therein.

BRIEF DESCRIPTION OF THE DRAWINGS

FIG. 3 is a bottom plan of the modified chassis assembly;

FIG. 4 is a longitudinal section, taken along section line 4—4 of FIG. 3;

FIG. 5 is a side elevation;

DESCRIPTION OF THE PREFERRED EMBODIMENTS

Figure 1:
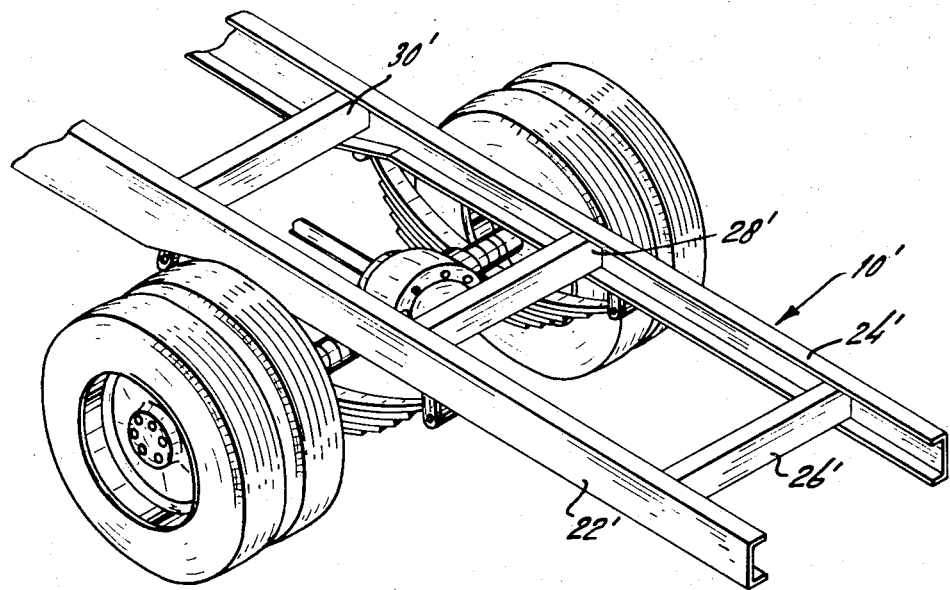
FIG. 1 is a fragmentary perspective of a conventional truck chassis, having longitudinally extending beams and transverse members of substantially similar cross section or height.

In FIG. 1 a conventional chassis 10' is illustrated as having longitudinally extending beams or channels 22' and 24' with intersecting transverse rear member 26', middle member 28', and front member 30'.

Figure 2:
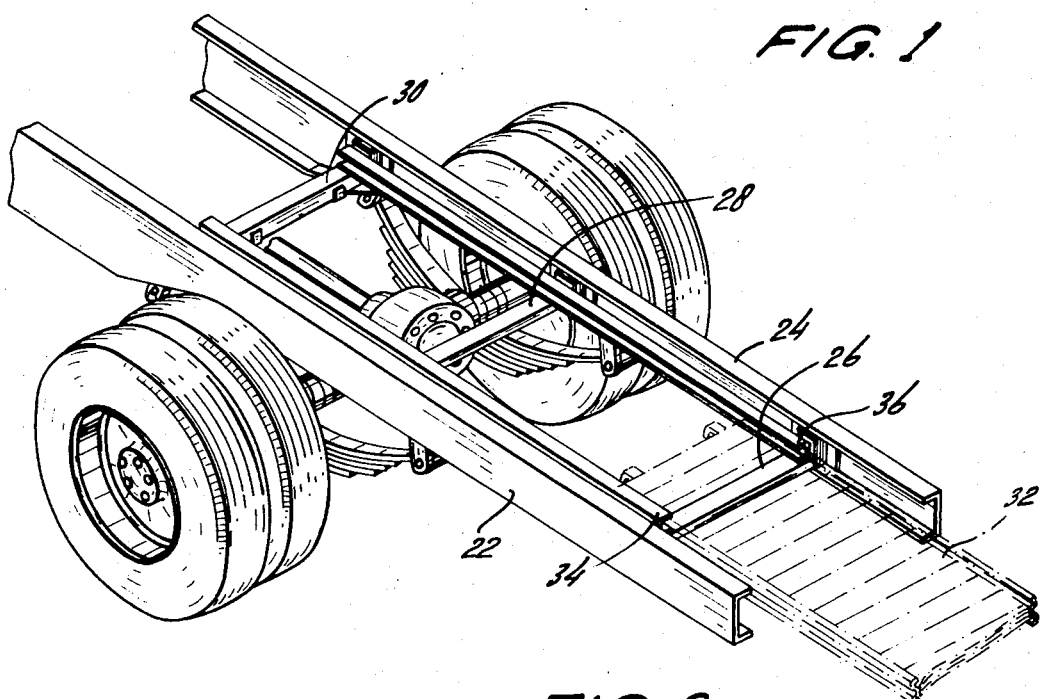
FIG. 2 is a fragmentary perspective of a chassis modified according to the present invention so as to provide a ramp storage space within the confines of the longitudinally extending members.

In FIG. 2 a chassis, modified according to the present invention, is illustrated as having identical longitudinally extending beams 22 and 24 with reduced cross section transverse rear member 26, middle member 28, and front member 30. Identical tracks or guide channels 34 and 36 may be supported on top of the transverse member ends as a guide for the wheeled ramp 32 stored within the chassis and shown in phantom.

In FIGS. 3-5, the chassis assembly is shown as extended by means of extension channels 38 and 40 secured to the rear of the longitudinal channels 22 and 24 by means of lugs 44 and 46. The rear transverse member 26 may be supported in these extension channels, which also may support ball socket web 48, ball socket 50, and horizontal guard members 52 and 54.

Figure 12:
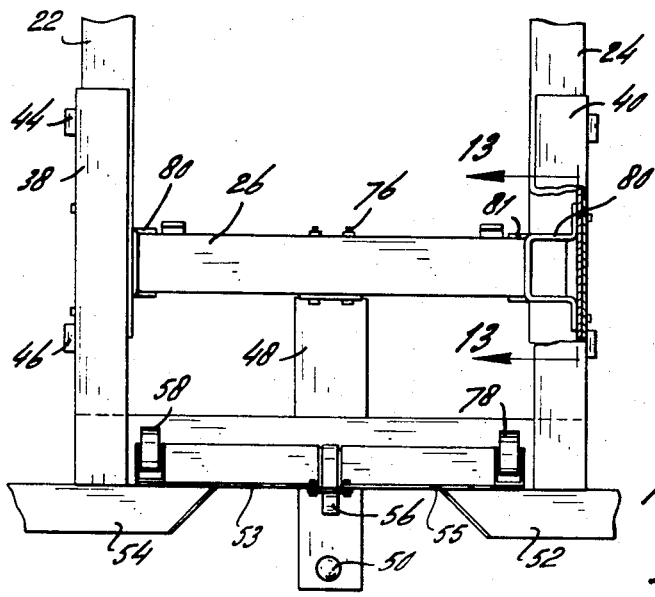
FIG. 12 is a fragmentary top plan of the rear end of the chassis, as extended, and supporting the rear transverse member.

As illustrated in FIG. 12, a locking lever 56 may be pivoted in the plates 53 and 55 which are supported above plates 52 and 54 and a pair of wheels 58-78 may be rotatably supported at either side as a guide for the underside of the extended ramp.

As particularly illustrated in FIGS. 4 and 5, the forward portions of longitudinal beams 22 and 24 may be vertically downwardly extended or inclined so that the plane of ramp support will extend above the differential and drive shaft (illustrated in phantom in FIG. 4).

Figure 6:
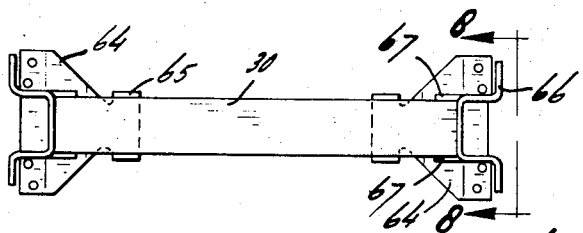
FIG. 6 is a top plan of the front transverse member and supporting plates.
Figure 8:
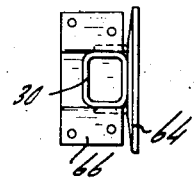
FIG. 8 is an end elevation, taken along line 8—8 of FIG. 6.
Figure 7:
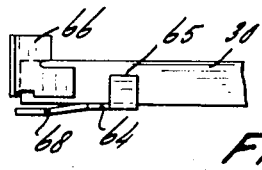
FIG. 7 is a fragmentary front elevation of one side of the FIG. 6 construction.

The front transverse member 30 is illustrated in FIGS. 6-8 as being constructed of rectangular tubing 30 resting at either end upon plates 64 which are secured to the longitudinal channel bottom by means of machine bolts or the like. Plate 64 includes vertical extension 65 which extends along the front and rear sides of the member 30. A gusset member 66 is secured to the vertical web of the channel by means of machine bolts or the like and extends over the top ends of member 30 and includes flange member 67, also extending along the front and sides of member 30. As illustrated in FIG. 7, plate 64 may include a downwardly inclined leaf 68 which raises the entire storage assembly above the differential.

Figure 9:
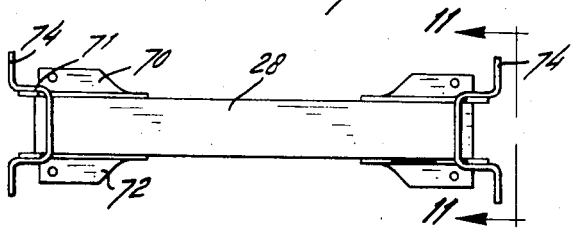
FIG. 9 is a top plan of the middle transverse member.
Figure 11:
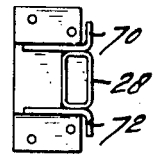
FIG. 11 is an end elevation taken along line 11—11 of FIG. 9.
Figure 10:
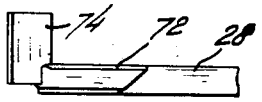
FIG. 10 is a fragmentary elevation from one side of the FIG. 9 construction.

The middle transverse member 28 is illustrated in FIGS. 9-11, as having identical plates 70 at 72, each supported upon the bottom of the chassis channels and extending front and rear along the sides of member 28. A slot 71 enables a gusset member 74 secured to the chassis web to extend through the plates 70 and 72 and abut the top of member 28.

Figure 13:
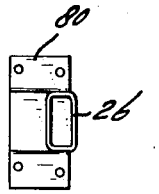
FIG. 13 is a transverse section, taken along section line 13—13 of FIG. 12.

In FIGS. 12 and 13, the rear transverse member 26 is illustrated as supported at either end upon the bottom of the channels 22 and 24. A gusset member 80 is secured to the web of the channel and the gusset extension extends over the top of the member 26 end, gusset fingers 81 extending on either side fore and aft thereof.

As will be apparent, the transverse members may be variously configured and various types of ramp tracks and locking elements may be employed without departing from the spirit of the invention.

We claim:

1. An automotive chassis of the type embodying reduced cross-section transverse members, providing storage space within the cross section of the chassis and comprising:
   A. a pair of longitudinally extending channels, each having an inwardly extending top and bottom and a vertically upstanding web member;
   B. front, middle, and rear transverse members supported at either end upon said channel bottoms and having a cross section less than the height of said channels, so as to define a longitudinally extending storage also above said transverse members and said channel bottoms and beneath the tops of said channel.

* * * * *